United States Patent
Park

(10) Patent No.: US 9,883,030 B2
(45) Date of Patent: Jan. 30, 2018

(54) METHOD AND APPARATUS FOR PROVIDING INTERFACE BASED ON VOICE RECOGNITION

(71) Applicant: Samsung Electronics Co., Ltd., Gyeonggi-do (KR)

(72) Inventor: Soonsang Park, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/321,213

(22) Filed: Jul. 1, 2014

(65) Prior Publication Data
US 2015/0004943 A1    Jan. 1, 2015

(30) Foreign Application Priority Data
Jul. 20, 2013 (KR) .................. 10-2013-0076287

(51) Int. Cl.
H04M 1/725 (2006.01)
H04M 3/42 (2006.01)
H04M 7/00 (2006.01)
H04M 1/656 (2006.01)

(52) U.S. Cl.
CPC ... *H04M 3/42357* (2013.01); *H04M 1/72519* (2013.01); *H04M 7/0036* (2013.01); *H04M 1/656* (2013.01); *H04M 1/72583* (2013.01); *H04M 2250/74* (2013.01)

(58) Field of Classification Search
USPC .................... 455/563, 456.1–456.6, 457
See application file for complete search history.

(56) References Cited

U.S. PATENT DOCUMENTS

| | | | |
|---|---|---|---|
| 8,055,707 B2 | 11/2011 | Desai et al. | |
| 8,428,654 B2* | 4/2013 | Oh | H04M 1/72583 455/414.1 |
| 2007/0054678 A1* | 3/2007 | Doulton | H04M 3/42382 455/466 |
| 2007/0249406 A1 | 10/2007 | Andreasson | |
| 2010/0009719 A1* | 1/2010 | Oh | H04M 1/72583 455/563 |
| 2013/0157697 A1* | 6/2013 | Kang | H04W 4/02 455/457 |
| 2013/0297308 A1* | 11/2013 | Koo | G06F 3/167 704/235 |
| 2014/0187225 A1* | 7/2014 | Miller | H04L 12/1818 455/418 |

* cited by examiner

*Primary Examiner* — Nicole Louis-Fils
(74) *Attorney, Agent, or Firm* — The Farrell Law Firm, P.C.

(57) ABSTRACT

Methods and apparatuses are provided for providing interfaces on call connected terminals. A first interface including text corresponding to a detected voice signal is provided, after connecting the call. A second interface including one or more items each indicating a corresponding function corresponding to a portion of the text is provided, when a selection of the portion of the text is received through the first interface. Indication information indicating a function indicated by a selected item is transmitted from the first terminal to the second terminal, when a selection of the item among the one or more items is received through the second interface. A function is performed at the second terminal, when the indication information is received from the first terminal.

12 Claims, 19 Drawing Sheets

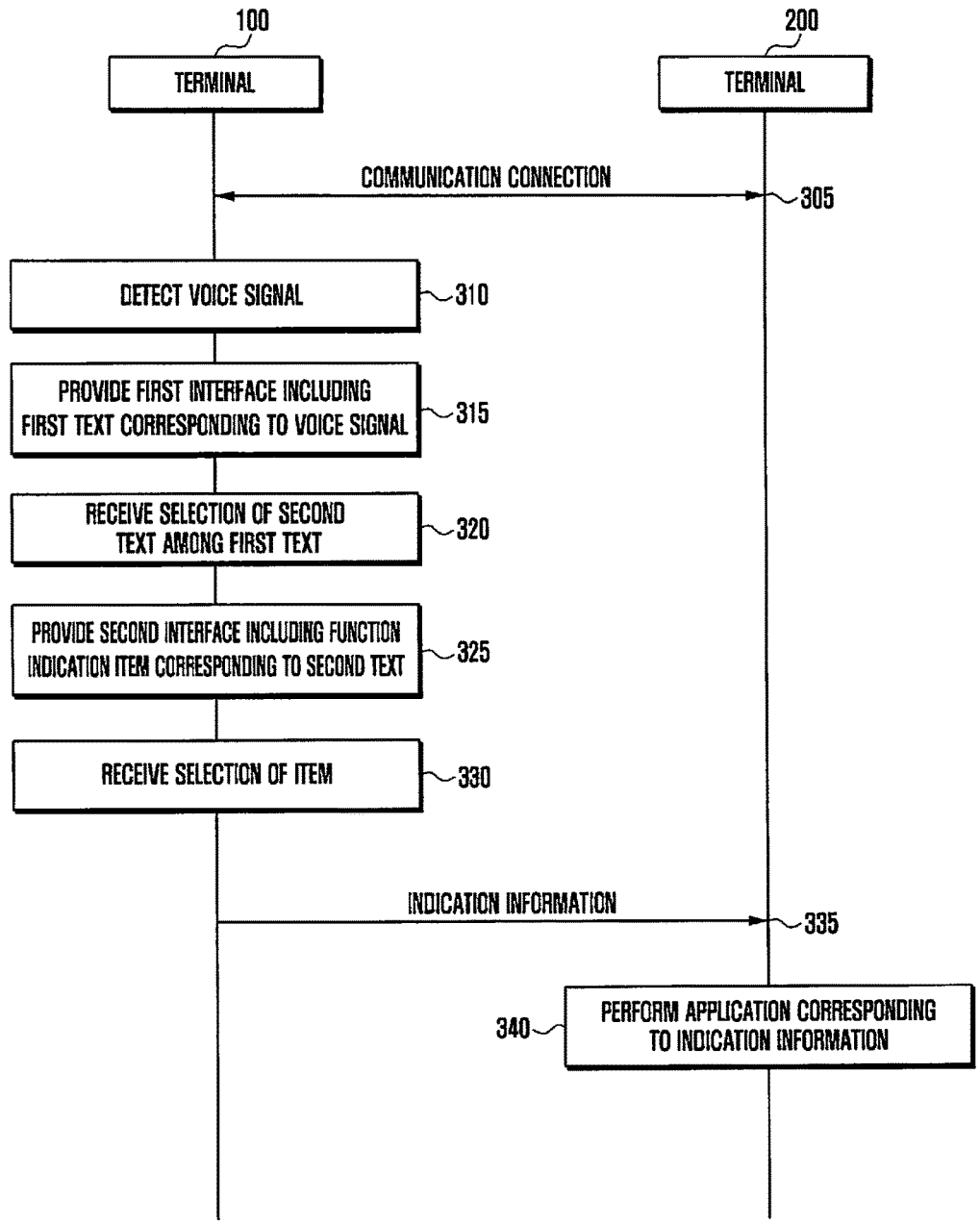

METHOD AND APPARATUS FOR PROVIDING INTERFACE BASED ON VOICE RECOGNITION

PRIORITY

This application claims priority under 35 U.S.C. § 119(a) to a Korean Patent Application filed on Jul. 1, 2013 in the Korean Intellectual Property Office and assigned Serial No. 10-2013-0076287, the entire disclosure of which is incorporated herein by reference.

BACKGROUND OF THE INVENTION

1. Field of the Invention

The present disclosure relates to a method and an apparatus for providing an interface.

2. Description of the Related Art

In addition to phone call functions, mobile phones, or portable terminals, provide various functions such as, for example, data communication, video play, gaming, and the like.

However, when using the mobile phone for a phone call, a user may have difficulty expressing a word that has a complex meaning or pronunciation. By using a data communication function of the mobile phone, materials related to a topic of conversation may be provided to another user. However, in order to provide these materials to the other user, various procedures are required to be performed, including, for example, an Internet search, a direct data transmission to the portable terminal of the other user, and the like. During such required procedures, it is difficult to maintain the voice call.

SUMMARY OF THE INVENTION

The present invention has been made to address at least the above problems and/or disadvantages and to provide at least the advantages described below. Accordingly, an aspect of the present invention provides a convenient interface during a phone call.

In accordance with an aspect of the present invention, a method is provided for providing an interface of a first terminal. A call is connected between the first terminal and a second terminal. A first interface including text corresponding to a detected voice signal is provided, after connecting the call. A second interface including one or more items each indicating a corresponding function corresponding to a portion of the text is provided, when a selection of the portion of the text is received through the first interface. Indication information indicating a function indicated by a selected item is transmitted from the first terminal to the second terminal, when a selection of the item among the one or more items is received through the second interface.

In accordance with another aspect of the present invention, a terminal is provided that includes a communication unit configured to connect a call between the terminal and a second terminal, an input unit configured to receive a selection, and a display unit configured to display an interface screen. The terminal also includes a controller configured to provide, after connecting the call, a first interface including text corresponding to a detected voice signal, and provide a second interface including one or more items, each indicating a corresponding function corresponding to a portion of the text, when a selection of the portion of the text is received through the first interface. The communication unit is further configured to transmit, to the second terminal, indication information indicating a function indicated by a selected item, when a selection of the item among the one or more items is received through the second interface.

In accordance with another aspect of the present invention, a method is provided for providing an interface of a first terminal. A call is connected between the first terminal and a second terminal. A function is performed when indication information indicating the function is received from the second terminal, after connecting the call.

In accordance with another aspect of the present invention, a terminal is provided that includes a communication unit configured to connect a call between the terminal and a second terminal. The terminal also includes a controller configured to perform a function when indication information indicating the function is received from the second terminal, after connecting the call.

BRIEF DESCRIPTION OF THE DRAWINGS

The above and other aspects, features, and advantages of the present invention will be more apparent from the following detailed description when taken in conjunction with the accompanying drawings, in which:

FIGS. 3A and 3B are a flowchart illustrating a call procedure of terminals, according to an embodiment of the present invention;

DETAILED DESCRIPTION OF EMBODIMENTS OF THE PRESENT INVENTION

Figure 1:
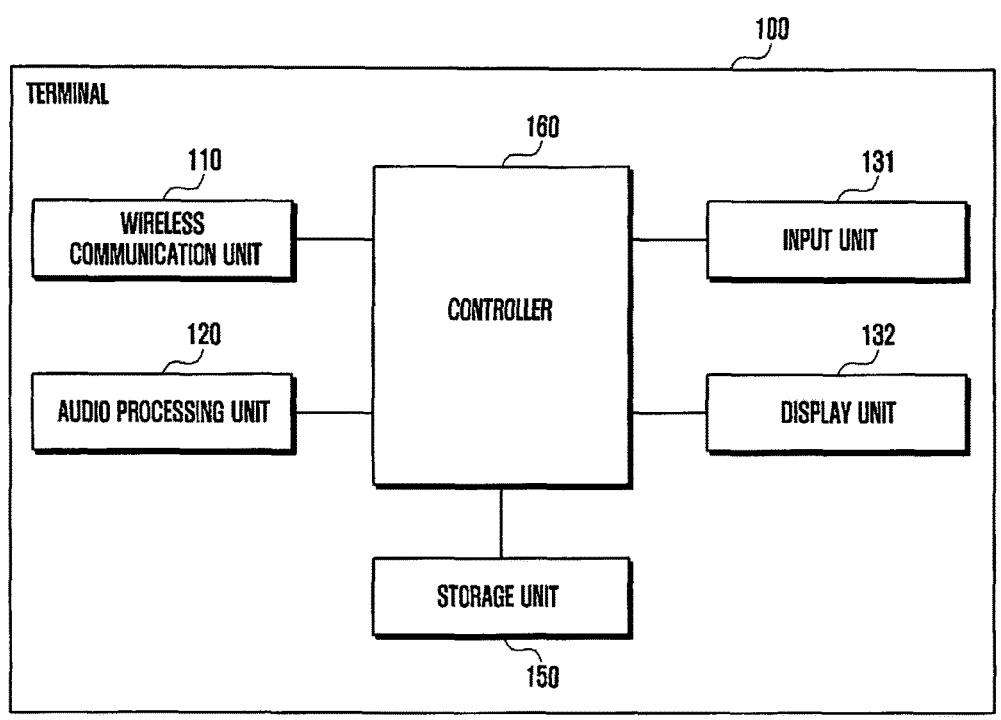
FIG. 1 is a block diagram illustrating a configuration of a terminal, according to an embodiment of the present invention.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 2:
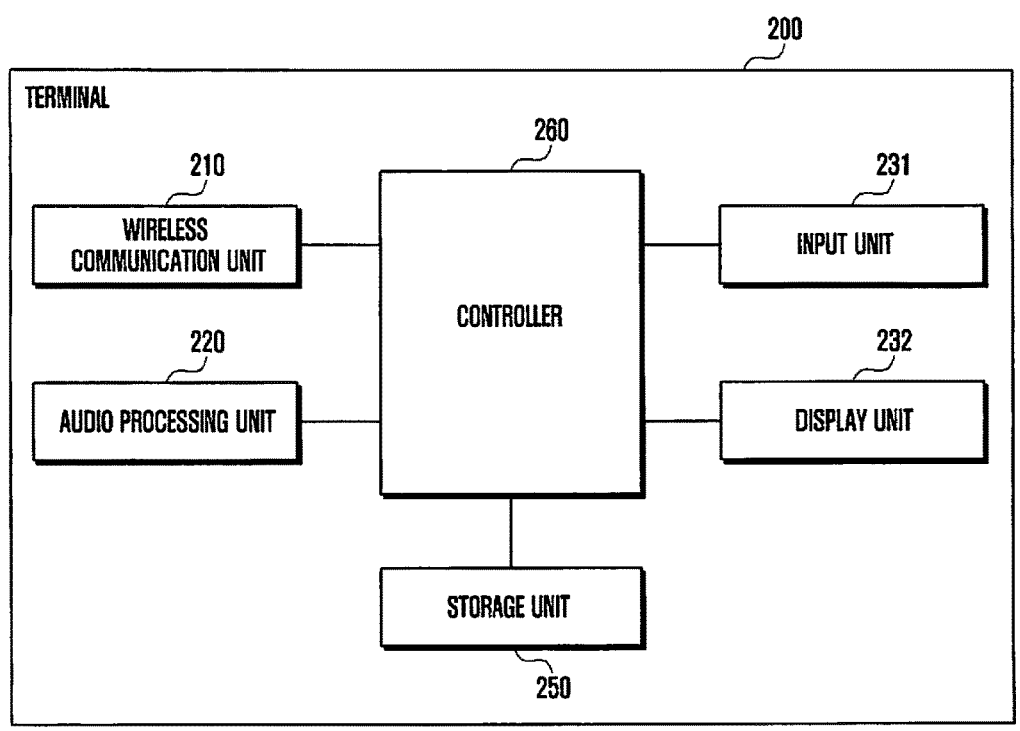
FIG. 2 is a block diagram illustrating a configuration of another user's terminal, according to an embodiment of the present invention.

FIG. 1 is a block diagram illustrating a configuration of a terminal, according to an embodiment of the present invention. FIG. 2 is a block diagram illustrating a configuration of another user's terminal, according to an embodiment of the present invention.

A terminal 100 may perform a voice call with another user's terminal 200. The terminal 100 may transmit indication information, which indicates performance of function according to a user input, to the other user's terminal 200 during the voice call. When receiving the indication information, the other user's terminal 200 performs a corresponding function. According to an embodiment of the present invention, the terminal 100 may perform a function of the other user's terminal 200 together with the other user's terminal 200, or the other user's terminal 200 may perform a function of the terminal 100 together with the terminal 100.

Referring to FIG. 1, according to an embodiment of the present invention, the terminal 100 includes a wireless communication unit 110, an audio processing unit 120, an input unit 131, a display unit 132, a storage unit 150, and a controller 160.

The wireless communication unit 110 may perform transmission and reception of a data and other signals for wireless communication of the terminal 100. The wireless communication unit 110 may include a Radio Frequency (RF) transmitter for up-converting and amplifying a frequency of a transmitted signal, and an RF receiver for low-noise amplifying a received signal and down-converting a frequency. The wireless communication unit 110 may include other similar communication modules that perform the above-described transmission and reception functions.

The wireless communication unit 110 may receive a data through a wireless channel and may output data to the controller 160. The wireless communication unit 110 may transmit data output from the controller 160 through the wireless channel. A terminal using wired communication instead of wireless communication may include a wired communication unit instead of the wireless communication unit 110. The wired communication unit and the wireless communication unit are provided as a communication unit. According to an embodiment of the present invention, both the wireless communication unit and the wired communication unit may be used together. The communication unit may transmit and receive a signal for a voice call and/or a video call.

In particular, according to an embodiment of the present specification, the wireless communication unit 110 may transmit the indication information generated by the controller 160, according to an input received by the terminal 100, to the other user's terminal 200. In addition, the wireless communication unit 110 may transmit additional information generated by the controller 160 to the other user's terminal 200. The additional information may be used as input for an application of the other user's terminal 200.

The audio processing unit 120 may convert a digital audio signal into an analog audio signal through an audio codec and may play the audio signal through a speaker (SPK). The audio processor 120 may convert an analog audio signal input from a microphone (MIC) into a digital audio signal through the audio codec. The audio processor 120 may include the codec. The codec may include a data codec for processing a packet data, and the like, and an audio codec for processing an audio signal such as a voice, and the like.

The input unit 131 may detect an input from the user to send a corresponding signal to the controller 160. The input unit 131 may include a touch sensor and/or a key input unit, or other input devices.

In particular, according to an embodiment of the present invention, the input unit 131 may receive an input through an interface among one or more interfaces of FIG. 3A to FIG. 8, which are described in greater detail below, and may provide the input to the controller 160.

The touch sensor may detect a touch of the user. The touch sensor may be configured with a touch detection sensor such as, for example, a capacitive overlay type, a resistive overlay type, an infrared beam type, and the like, or the touch sensor may be configured with a pressure sensor. In addition to the above sensors, various sensors that can detect contact or pressure of object may be used as a touch sensor in embodiments of the present invention. The touch sensor may detect the user's touch input, and generate a sensing signal to transmit to the controller 160. The sensing signal may include coordinate data in which the user inputted a touch. When the user inputs an operation of touch position movement, the touch sensor may generate the sensing signal, which includes the coordinate data of touch position movement path, and may transmit the sensing signal to the controller 160.

Embodiments of the present invention may be applied to the terminal 100 with or without the touch sensor.

The key input unit may receive a user's key operation for controlling the terminal 100, and generate an input signal to send to the controller 160. The key input may be configured with a keypad including a number key, and an arrow key, and may be formed as a certain function key on a surface of the terminal 100. In case of a terminal that can perform all operations using only the touch sensor, the key input may be omitted.

The display unit 132 may visually provide a menu of the terminal 100, input data, function setting information, and various other information to the user. The display unit 132 may be formed by using any one of a Liquid Crystal Display (LCD), Organic Light Emitting Diodes (OLED), Active Matrix Organic Light Emitting Diodes (AMOLED), and other devices for displaying a screen. The display unit 132 may perform a function of outputting a booting screen, an idle screen, a menu screen, a call screen, and other application screens of the terminal 100. In addition, the display unit 132 may display an interface screen under the control of the controller 160. Detailed operations of the interface display are described in greater detail below with reference to FIG. 3A to FIG. 8.

The storage unit 150 may store a program and data necessary for the operation of the terminal 100. The storage unit 150 may be divided into a program area and a data area. The program area may store a program that controls an overall operation of the terminal 100, an Operating System (OS) for booting the terminal 100, an application program necessary for playing multimedia content, and an application program necessary for other functions of the terminal 100, such as, for example, a camera function, an audio play function, and an image or a video play function. The data area is an area in which data generated according to the use of the terminal 100 is stored. The data area may store, for example, an image, a video, a phone book, audio data, etc.

According to an embodiment of the present invention, the storage unit 150 may store information on a function item related to a plurality of keywords and each keyword (or text) forming the plurality of keywords. By using this information, the controller 160 may provide a corresponding function item, when a specific keyword (or text) is selected. The controller 160 may display some keywords to be distinguished from other text according to a type or an attribute of the function item corresponding to the keyword (or text). The information stored in the storage unit 150 and a method for utilizing the information are described in greater detail below with reference to FIG. 3A to FIG. 8.

The controller 160 may control an overall operation of each element of the terminal 100. Particularly, the controller 160 may receive an input signal from the input unit 131, and may control the display unit 132 to display the interface screen. In particular, the controller 160 may perform voice recognition for a voice signal input through the audio processing unit 120 to obtain a text. The controller 160 may control the display unit 132 to display the interface screen including the recognized text. Detailed operations of each configuration of the terminal 100 are described in greater detail below with reference to FIG. 3A to FIG. 8.

Referring to FIG. 2, the other user's terminal 200 includes a wireless communication unit 210, an audio processing unit 220, an input unit 231, a display unit 232, a storage unit 250, and a controller 260. As described above, the terminal 100 and the other user's terminal 200 mutually perform communication with each other. The configuration of the terminal 100 is substantially identical to the configuration of the other user's terminal 200. However, the terminal 100 is described based on a function of generating and transmitting indication information, and the other user's terminal 200 is described based on a function of receiving and processing the indication information. As described above, the other user's terminal 200 may perform a part or all of the functions of the terminal 100.

According to an embodiment of the present invention, the wireless communication unit 210 may receive the indication information from the terminal 100 to transmit to the controller 260. In addition, the wireless communication unit 210 may receive additional information from the terminal 100 to transmit to the controller 260.

According to an embodiment of the present invention, the storage unit 250 may store an application program that can be performed according to the indication information received from the terminal 100.

Figure 3B:
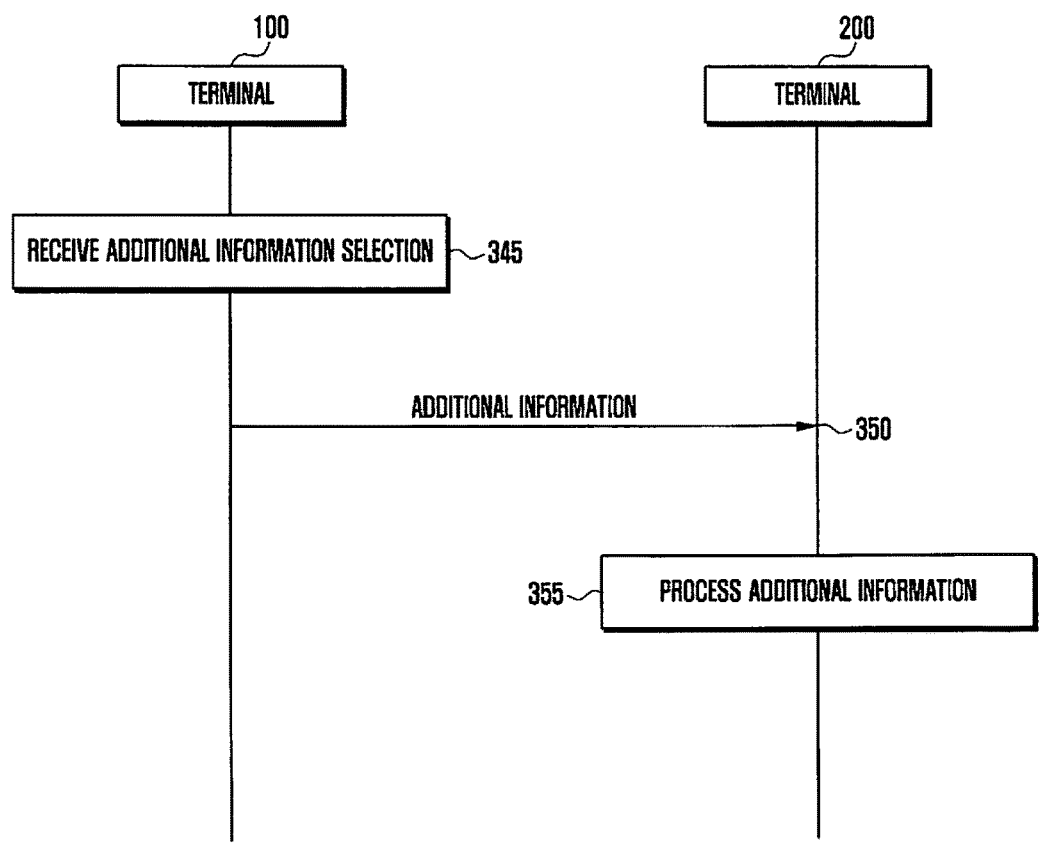

FIGS. 3A and 3B are a flowchart illustrating a call procedure of terminals, according to an embodiment of the present invention. The procedure of FIG. 3B may be executed after the procedure of FIG. 3A. However, according to an alternate embodiment of the present invention, the procedure of FIG. 3B may be omitted.

Referring to FIG. 3A, the terminal 100 and the other user's terminal 200 establish a communication connection with each other, in step 305. The user may operate the terminal 100 so that the wireless communication unit 110 establishes a connection to the other user's terminal 200 for a voice call and/or a video call. On the contrary, the other user may operate the other user's terminal 200 so that the wireless communication unit 210 establishes a connection to the terminal 100 for a voice/video call. The user of each terminal 100 and 200 may speak into a microphone of a phone in a state in which the call connection is maintained.

The controller 160 of the terminal 100 detects a voice signal input through the audio processing unit 120, in step 310. The controller 160 provides a first interface, which includes text (first text) corresponding to the detected voice signal, in step 315. The text corresponding to the detected voice signal may include, for example, a text obtained by performing voice recognition for the corresponding voice signal.

FIGS. 4A to 4D illustrate interfaces of a communication procedure, according to an embodiment of the present invention.

Figure 4A:
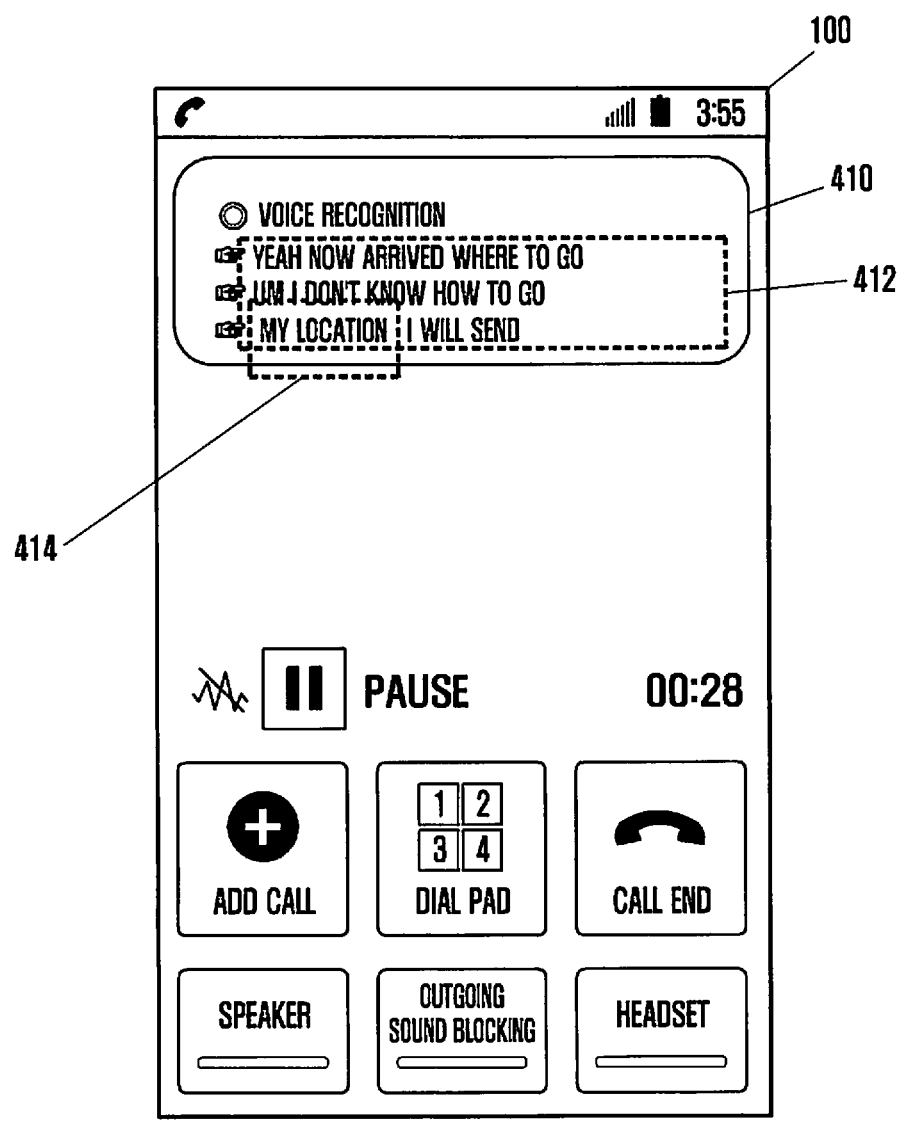
FIGS. 4A to 4D illustrate interfaces of a communication procedure, according to an embodiment of the present invention.

Referring to FIG. 4A, a first interface is shown that includes the first text corresponding to the detected voice signal of step 310. The display unit 132 of the terminal 100 displays an interface 410. The interface 410 includes text 412 of the detected voice. For example, the interface 410 may display a text of 300 bytes of most recently recognized voice data. According to another example, the interface 410 may display the text of all voice data recognized after the call has started, and may provide a scroll bar control when a display area of the display unit 132 is insufficient.

As described below, a corresponding function is set with respect to a word and/or a phrase constituting a text. Information on a word and/or a phrase and a function corresponding to the word and/or the phrase may be stored in the storage unit 150. Table 1 shows an example of a correlation between a word and/or a phrase and a function.

TABLE 1

| Text | Function |
| --- | --- |
| My Location | Provide to display location sensed by GPS |
| Gangnam station | Search by map application and display location |
| Seoul station | Search by map application and display location |
| Notepad | Execute text edit program |
| Schedule | Execute schedule management application |
| ... | ... |

For example, when the phrase "my location" is selected, the terminal 100 may obtain location information of the terminal 100 by using a location sensor, e.g., a Global Positioning System (GPS) module, and may transmit this location information and indication information, which provide an indication to display corresponding location information on a map of the other user's terminal 200. The other user's terminal 200 may provide a screen that displays the location information of the terminal 100 on the map, according to corresponding indication information.

Other functions may be applied in addition to those shown in Table 1. When a phrase/word (text) related to a specific function is detected, the controller 160 may display the corresponding phrase/word in a manner distinguished from other text. For example, since "my location" 414 corresponds to a function "provide to display location sensed by GPS", it may be displayed in a manner distinguished from other text.

For example, the color of the text "my location" 414 may be set differently from the rest of the text, or the background color of the text "my location" 414 may be set differently from the background color of the rest of the text. Alternatively, a part of a font, a font size, a boldface type, italic letters, underlined, a superscript, and a subscript may be set differently from the rest of the text with respect to the text "my location" 414. A specific text or a specific icon may be displayed around the text "my location" 414 to display that the text "my location" 414 corresponds to a specific function. The text "my location" 414 may flicker to be distinguished from the rest of the text.

As shown in Table 1, when various functions are supported, a different text color or a different icon may be allocated for each function. For example, the text "Gangnam Station" and the text "Seoul Station" may be displayed as a red color, and the text "Notepad" may be displayed as a yellow color. According to an alternate embodiment of the present invention, even if various functions are supported, all text related to a special function as shown in Table 1 may be displayed as a red color.

Instead of the information of Table 1, a natural language processing method may be used. For example, the controller 160 may estimate a close meaning of a corresponding text by performing natural language processing for the recognized text, and may determine a corresponding function according to the estimated meaning. For example, in the sentence "go to X", the "X" may be estimated as a text that indicates a location, and accordingly, if the "X" is selected, a map search function may be provided.

Text corresponding to a voice signal input through the audio processing unit 120, i.e., a voice spoken by the user of the terminal 100, is displayed. However, the method of displaying text, which is recognized from a voice signal converted from a signal transmitted from the other user's terminal 200, may also be provided. In addition, the voice signal input through the audio processing unit 120 and the voice signal converted from the signal transmitted from the other user's terminal 200 may be displayed in parallel. Hereinafter, for convenience, it is illustrated that only the text recognized by the voice signal input through the audio processing unit 120 is displayed.

Returning to FIG. 3A, the input unit 131 receives a selection of second text among the displayed first text, in step 320. Referring to FIG. 4A, the user may select the text "my location" 414 among the first text 412. A touch input at location where the text "my location" 414 is displayed, or other cursor movement input and a confirmation key input, may be identified as an input for selection. The selection may be performed in a spacing unit and/or in a word unit. For example, in FIG. 4A, the "yeah", "now", "arrived" may be the unit of selection. When a part of the text "arrived" and/or a location sufficiently adjacent to the text "arrived" is selected, the "arrived" may be selected. In the case of a phrase that stores a related function like the "my location", the "my location" may be a selection unit as a whole regardless of the spacing unit or the word unit. According to another embodiment of the present invention, the natural language processing method may be applied to set an appropriate selection unit. For example, if two words having strong semantic relevance are located close together, the two words may be one selection unit.

Figure 4B:
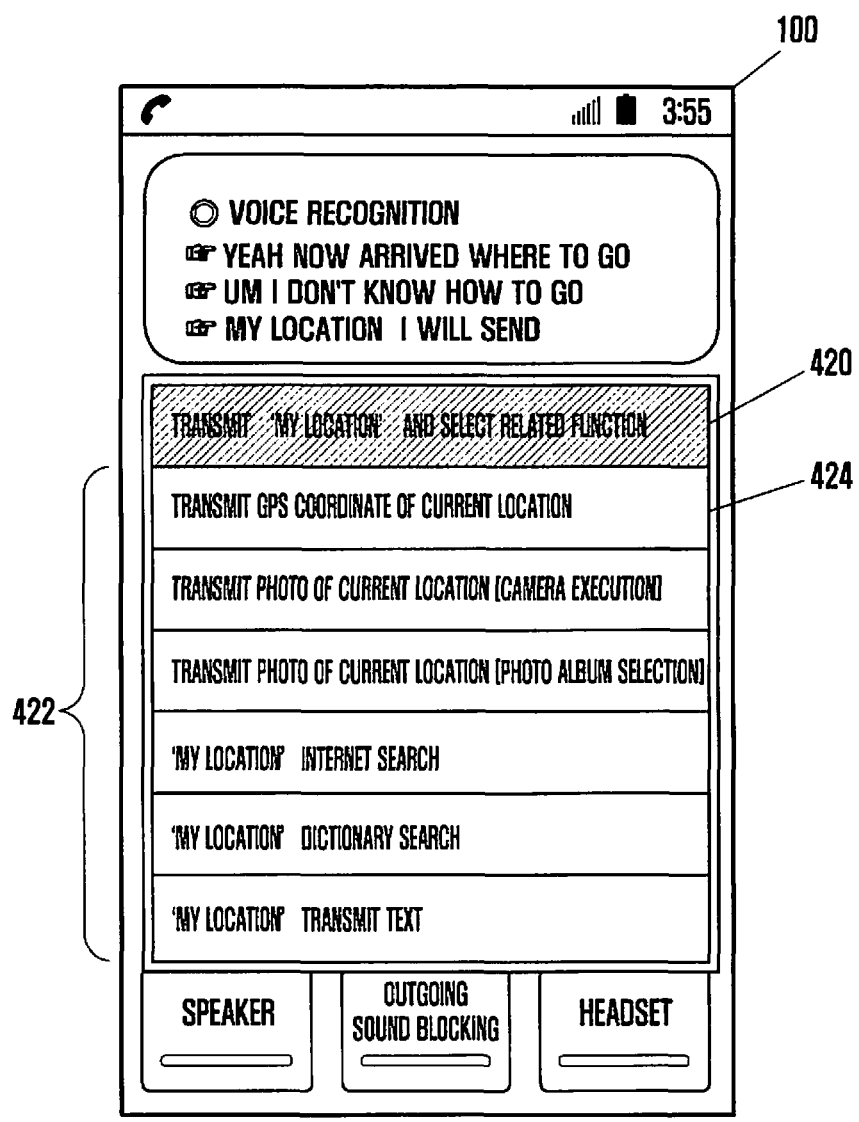

Referring back to FIG. 3A, when the selection input is detected, the controller 160 displays a second interface through the display unit 132, in step 325. Referring to FIG. 4B, the terminal 100 provides a screen of a second interface 420. The screen of the second interface 420 includes a list 422 of functions corresponding to the selected text "my location" 414. The list 422 may further include special functions related to the current location.

The function list 422 may include one or more basic function items and one or more special function items. The basic function items may be applied to all text. For example, at least some of a web search, a dictionary search, and a text transmission for a corresponding text may be included in the basic function items. The special function items may be applied only to a corresponding text. The special function items for the text related to the location may include a map search function.

Referring to FIG. 4B, the list 422 includes basic function items (an internet search, a dictionary search, a text transmission) and special function items (a GPS coordinates transmission, a camera execution, an album selection). The user may select any one of the items.

Referring again to FIG. 3A, the input 131 receives the selection input of any one item among the list included in the second interface, in step 330. For example, the input unit 131 may receive the selection of an item 424 indicating a display of the location information of the terminal 100 among the list 422 of FIG. 4B.

When receiving the selection input of the item indicating a function, the controller 160 generates indication information corresponding to the pertinent item and transmits the indication information to the other user's terminal 200 through the communication unit 110, in step 335. The indication information may include identification information of a function that the other user's terminal 200 should perform. In addition, the indication information may further include a parameter required to perform a corresponding function. For example, the parameter may include one or more of keyword information for a web search function (a map search/a dictionary search), and location information utilized for displaying a map, or some other similar parameters.

Figure 3C:
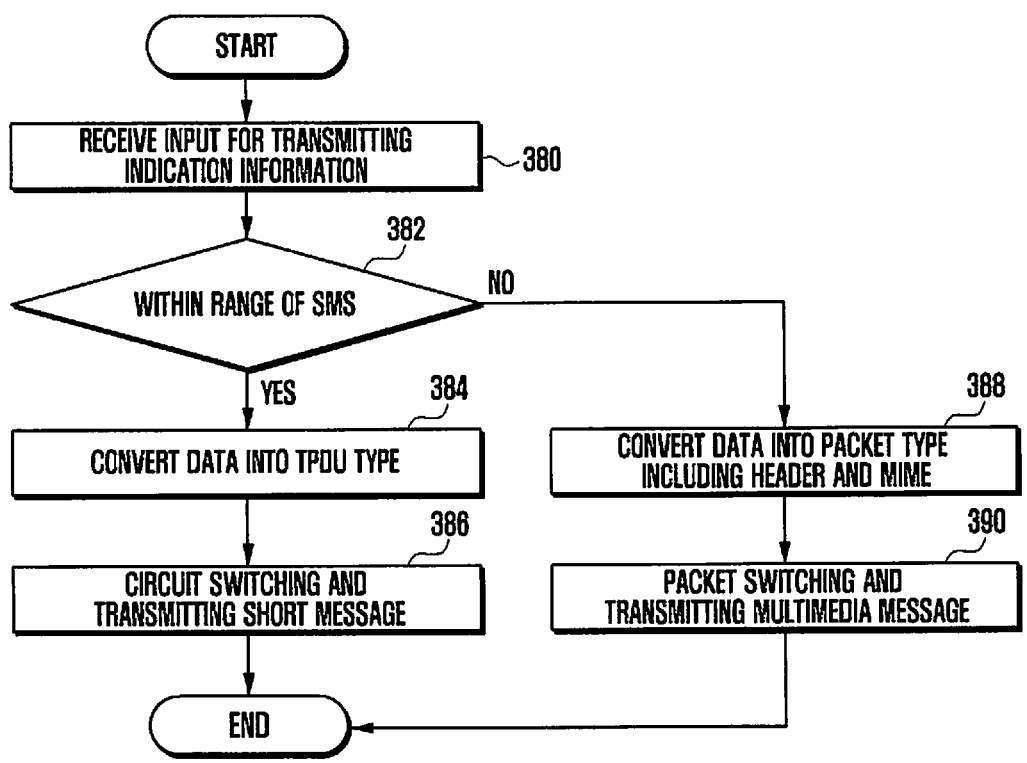
FIG. 3C is a flowchart illustrating an indication information transmission procedure, according to an embodiment of the present invention.

FIG. 3C is a flowchart illustrating an indication information transmission procedure of step 330, according to an embodiment of the present invention.

The input unit 131 of the terminal 100 receives an input for transmitting the indication information, in step 380. For example, the input unit 131 may receive the selection input of any one item of the function list, and this input is an input for transmitting indication information. The controller 160 generates the indication information corresponding to the selected transmitted input and determines whether the indication information is within a range of transmission based on a Short Message Service (SMS) standard, in step 382.

When the indication information is within a length range of the SMS, the controller 160 converts data into a Transaction Protocol Data Unit (TPDU) type. The controller 160 performs a circuit switching so that the communication unit 110 may utilize a circuit network, and transmits an SMS including the indication information of the TPDU type to the other user's terminal 200 through the circuit network, in step 386.

When the indication information is beyond the length range of the SMS, the controller 160 converts the data into a packet type including a header and Multipurpose Internet Mail Extensions (MIME), in step 388. The controller 160 performs a packet switching so that the communication unit 110 may utilize a packet network, and transmits a multimedia message including the indication information of a packet type to the other user's terminal 200 through the packet network, in step 390. Instead of steps 388 and operation 390, an indication information transmission process of a long message type may be utilized.

The indication information may be transmitted according to the procedure of FIG. 3C. However, according to another embodiment of the present invention, the indication information may be transmitted from the terminal 100 to the other user's terminal 200 through communication using another type of signal/packet besides short message/multimedia message/long message.

Referring back to FIG. 3A, the communication unit 210 of the other user's terminal 200 receives the indication information, in step 340, to transmit to the controller 260. The controller 260 of the terminal 200 may perform an application (or other function) corresponding to the indication information received, in step 340.

Figure 4C:
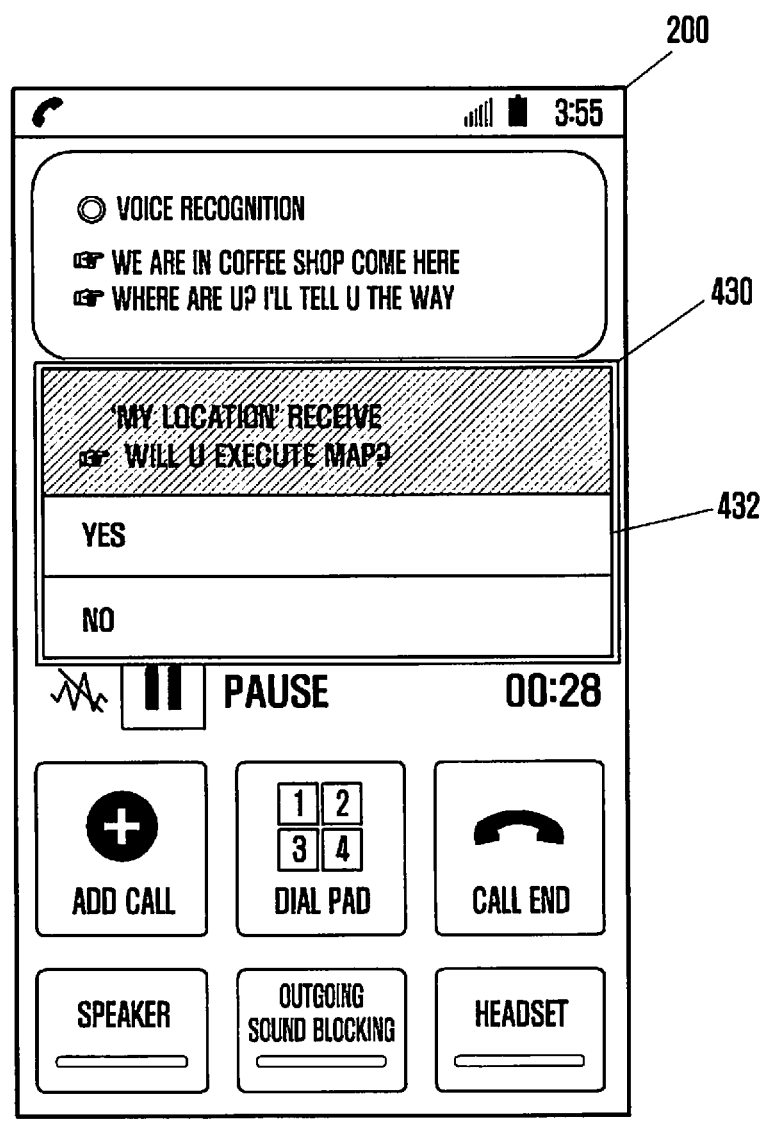
Figure 4D:
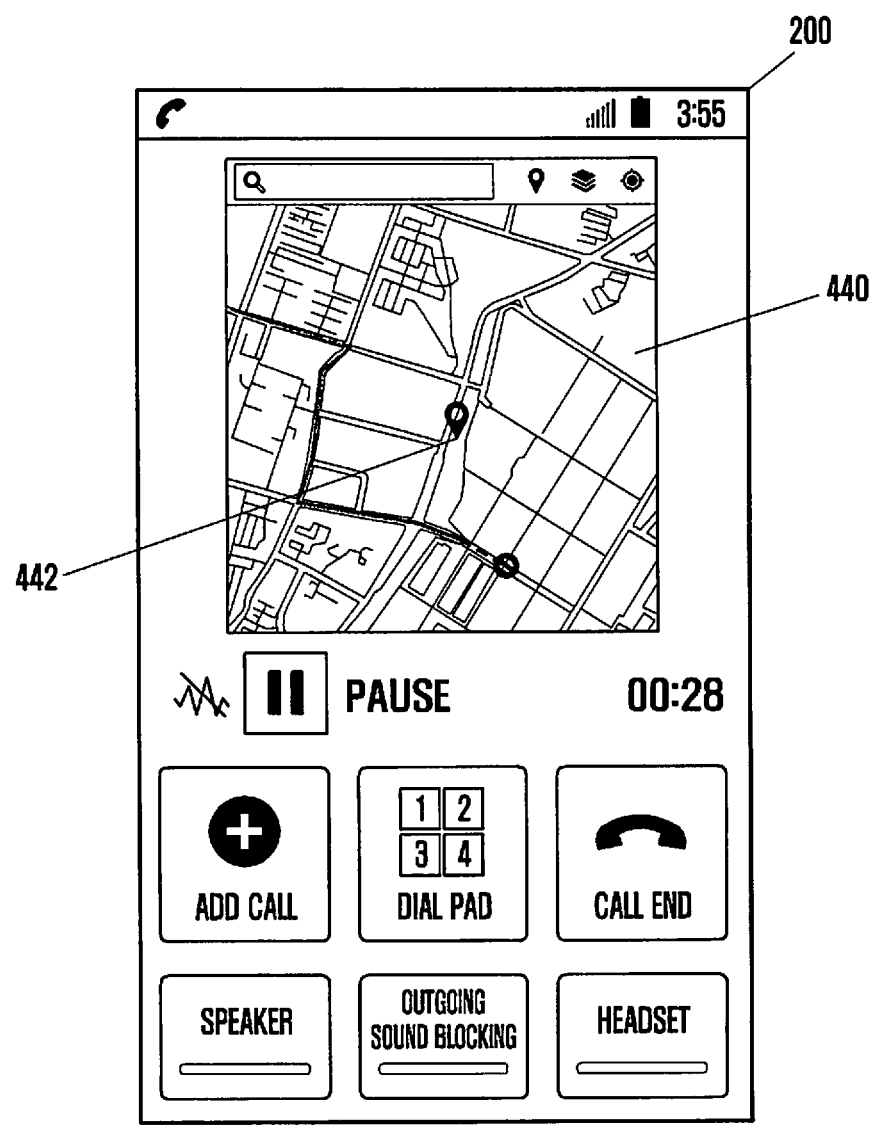

Referring to FIG. 4C, the controller 260 of the other user's terminal 200 displays an interface 430 asking whether to execute a function according to the received indication information through the display unit 232. When the other user selects a "Yes" button 432, a corresponding function is executed. In the embodiment of FIG. 4A to FIG. 4D, the transmitted indication information may indicate a function of displaying a location of the terminal 100. Thus, in FIG. 4D, the other user's terminal 200 displays a map 440 through the display unit 232, and displays an icon indicating a location 442 of the terminal 100 on the map. The location information of the terminal 100 may be included in the above-described indication information.

FIGS. 5A to 5D illustrate interface screens, according to another embodiment of the present invention.

The interface screens of FIGS. 5A to 5D correspond to the performance of the procedure of FIG. 3A.

Figure 5A:
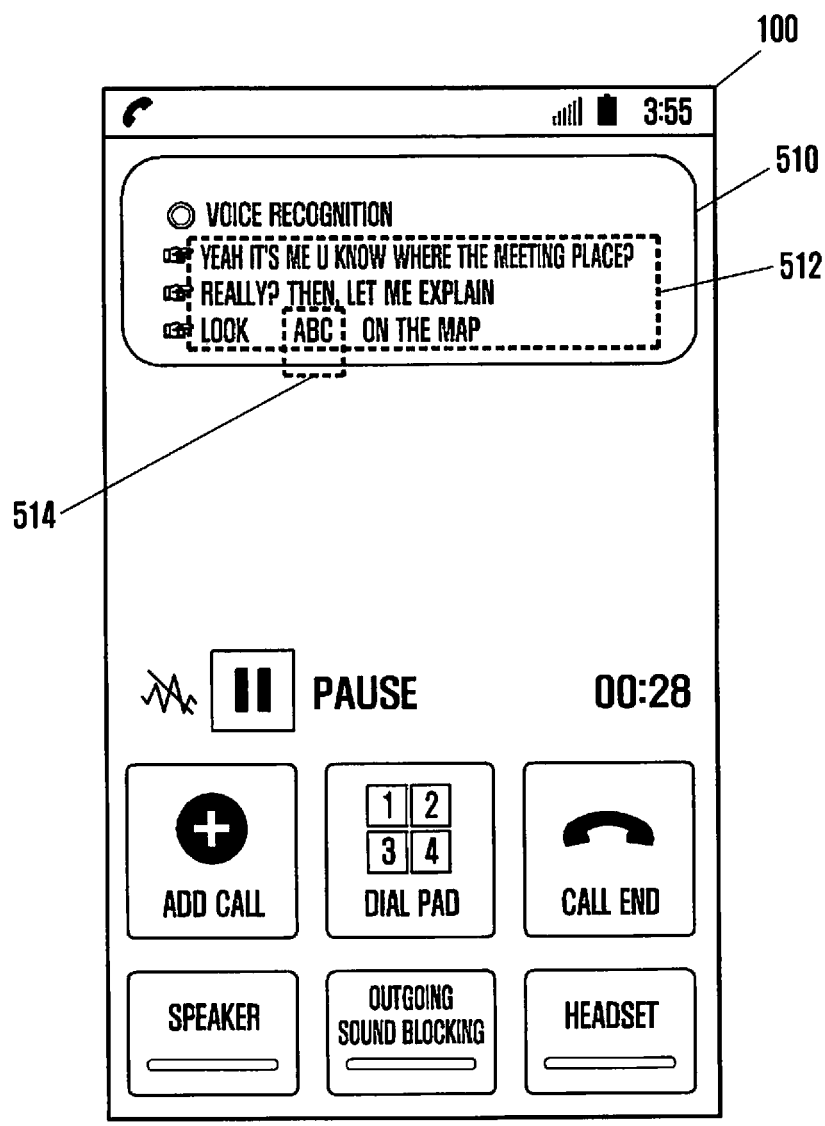
FIGS. 5A to 5D illustrate interface screens of a communication procedure, according to another embodiment of the present invention.
Figure 5B:
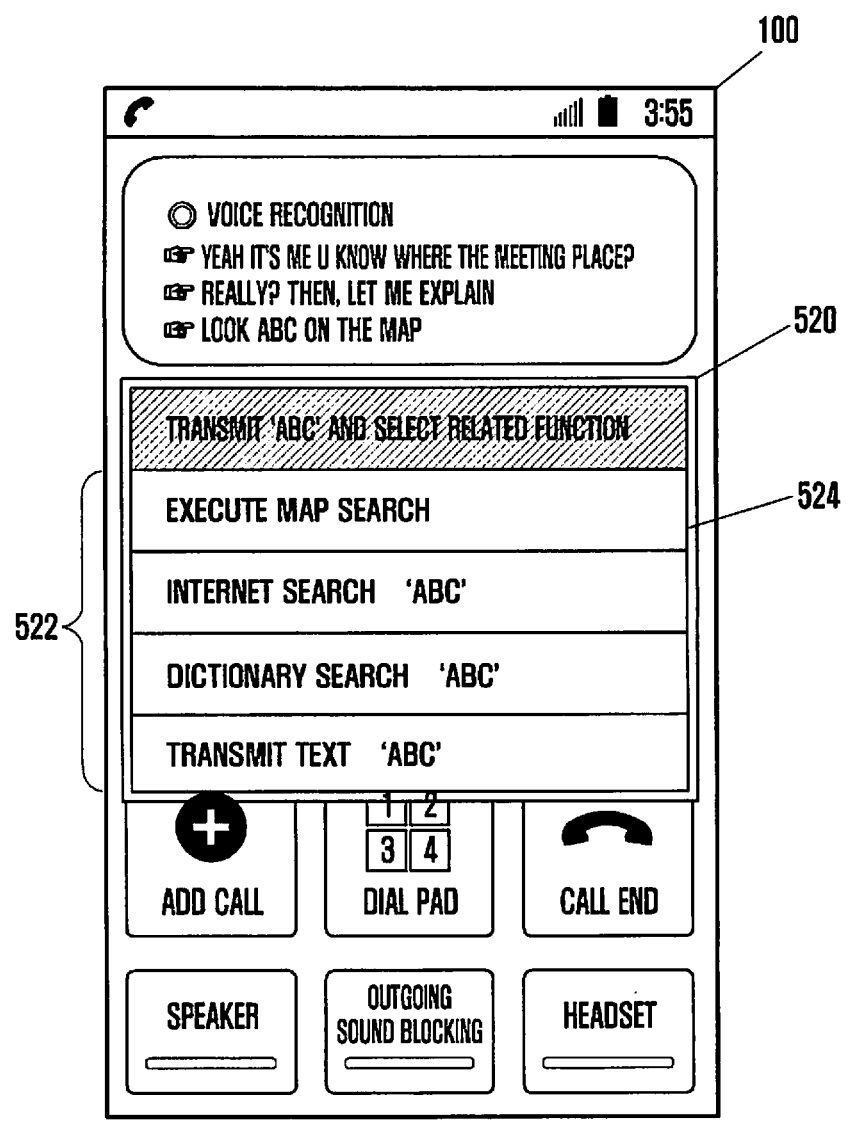

Referring to FIG. 5A, a first interface 510 of the terminal 100 is displayed. The first interface includes voice recognized text 512. The user may select a text "ABC" 514. Accordingly, the terminal 100 displays a second interface 520 of FIG. 5B. The second interface 520 includes a function list 522 corresponding to the text "ABC". A map search execution item 524 is included in the function list 522 corresponding to the text "ABC". The terminal 100 receives the selection input for the map search execution item 524. Accordingly, the indication information indicating a map search execution may be transmitted from the terminal 100 to the other user's terminal 200. The indication information may include indicators indicating the map search execution and a parameter (text "ABC") for the relevant function.

Figure 5C:
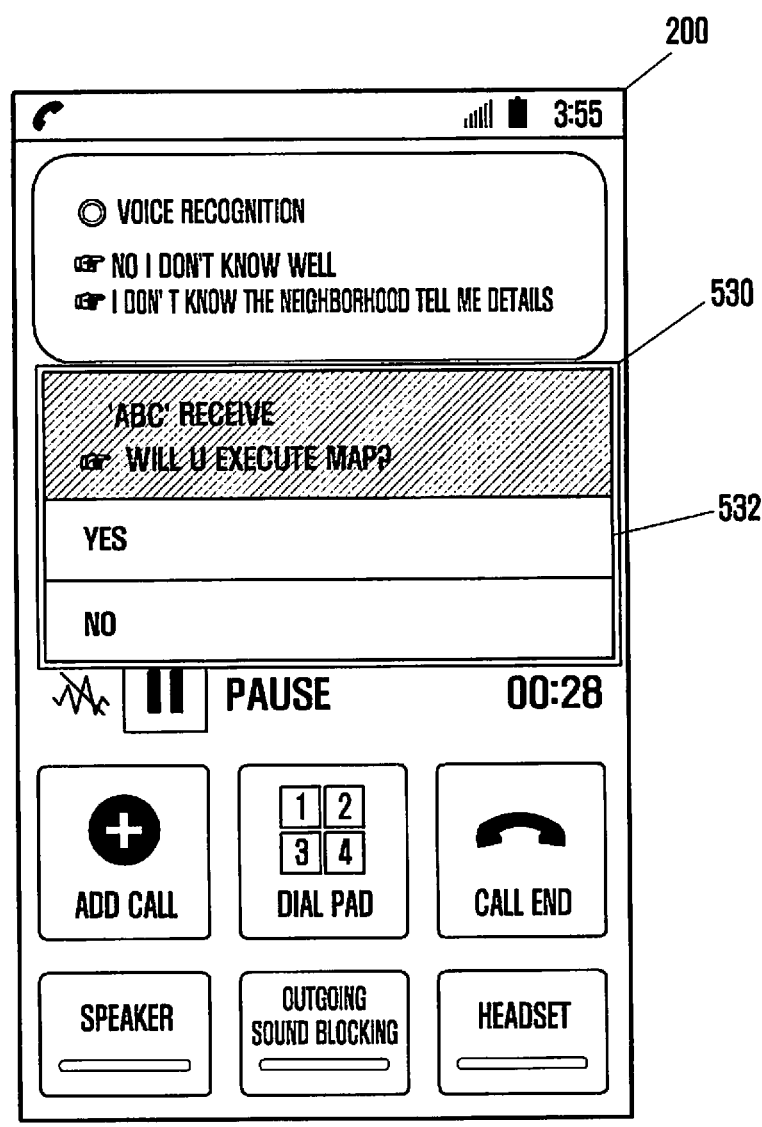
Figure 5D:
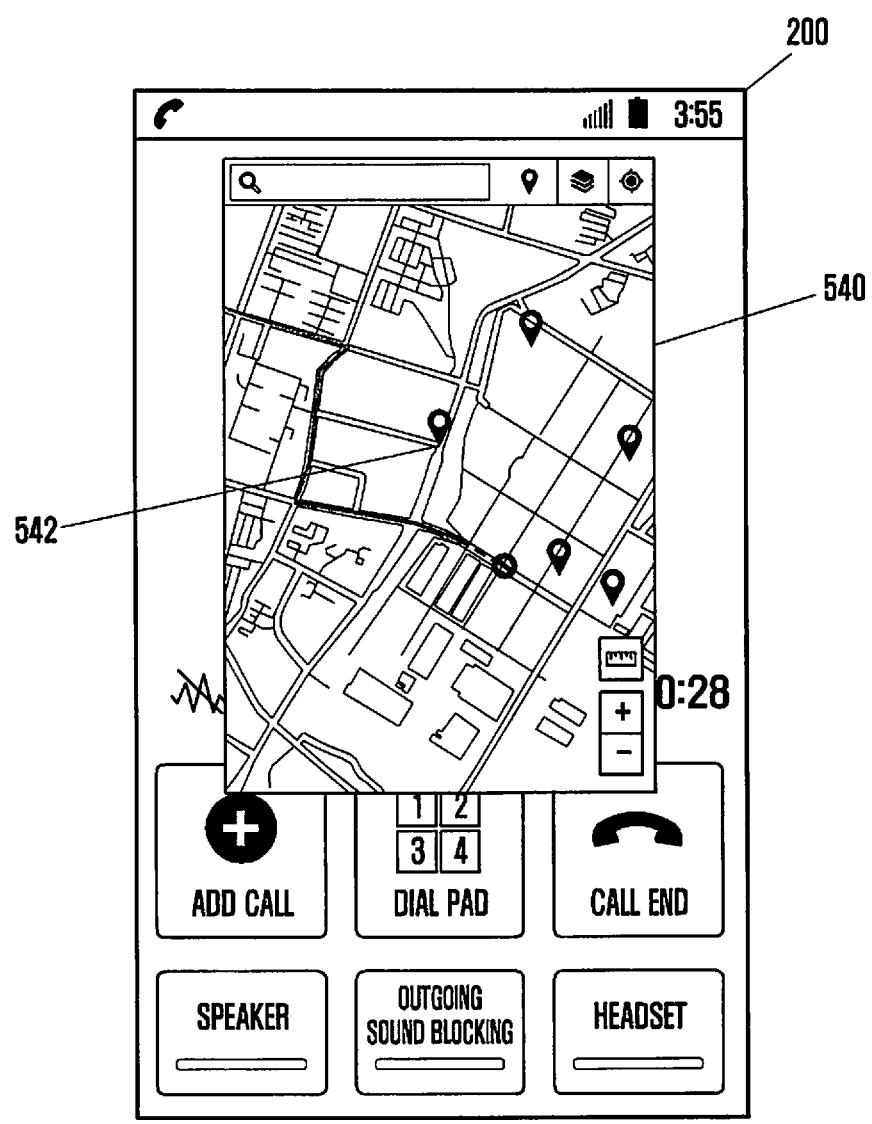

When the indication information is transmitted to the other user's terminal 200, as shown in FIG. 5C, the terminal 200 may display an interface 530 asking whether to execute the map search function according to the indication information. When a "Yes" button 532 is selected, a screen 540 of the map search function may be displayed as shown in FIG. 5D. A location 542 of a search result of a search word "ABC" may be displayed within the map 540 through the icon, or the like.

FIGS. 6A to 6D illustrate interface screens, according to another embodiment of the present invention.

The interface screens of FIGS. 6A to 6D correspond to the performance of the procedure of FIG. 3A.

Figure 6A:
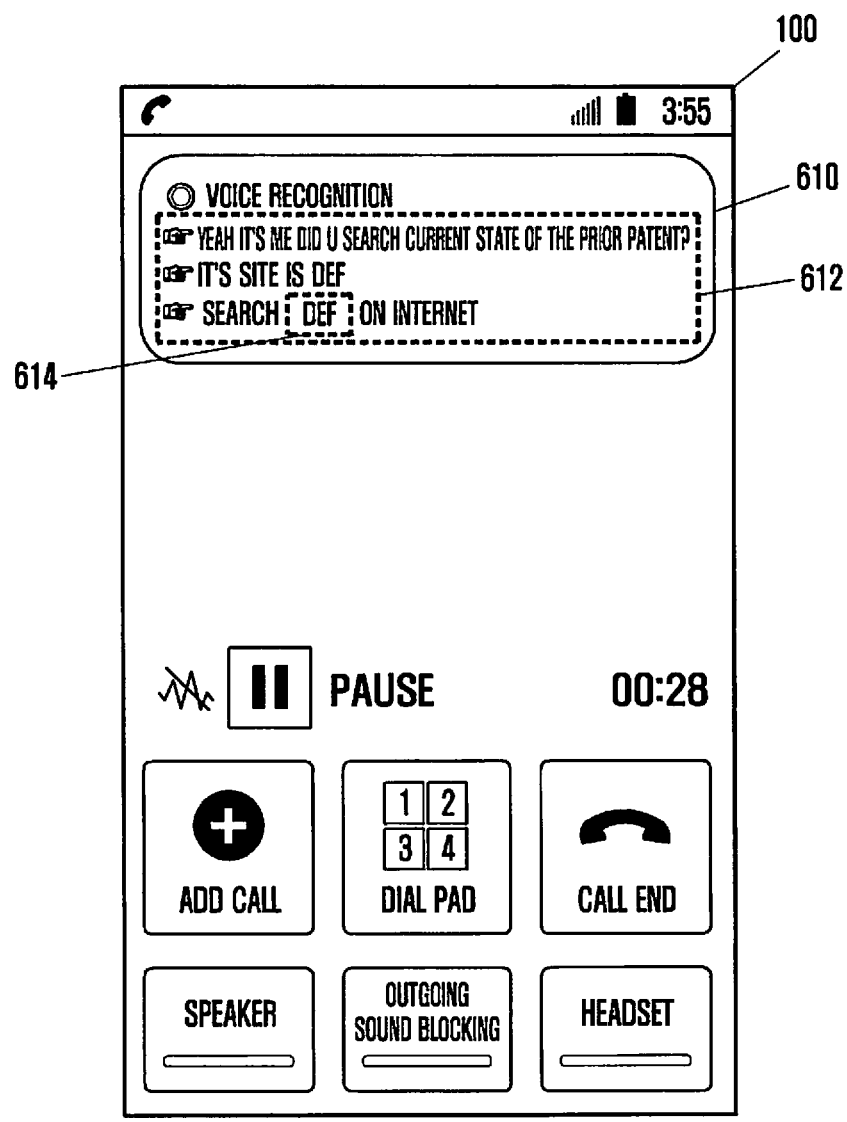
FIGS. 6A to 6D illustrate interface screens of a communication procedure, according to another embodiment of the present invention.
Figure 6B:
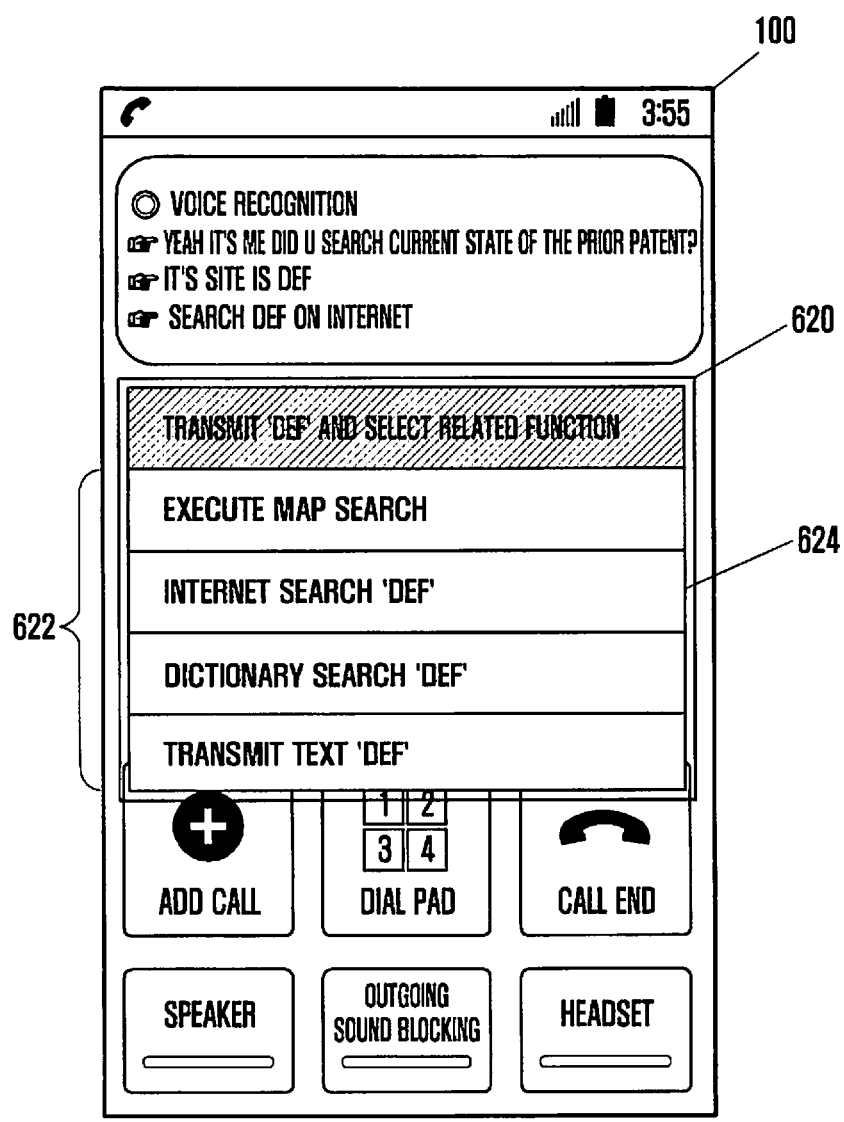

Referring to FIG. 6A, a first interface 610 of the terminal 100 is displayed. The first interface 610 includes voice recognized text 612. The user may select a text "DEF" 614. Accordingly, the terminal 100 displays a second interface 620 of FIG. 6B. The second interface 620 includes a function list 622 corresponding to the text "DEF". An Internet search execution item 624 is included in the function list 622 corresponding to the text "DEF". The terminal 100 receives the selection input for the Internet search execution item 624. Accordingly, the indication information indicating an Internet search execution may be transmitted from the terminal 100 to the other user's terminal 200. The indication information may include indicators indicating the Internet search execution and a parameter (text "DEF") for the relevant function.

Figure 6C:
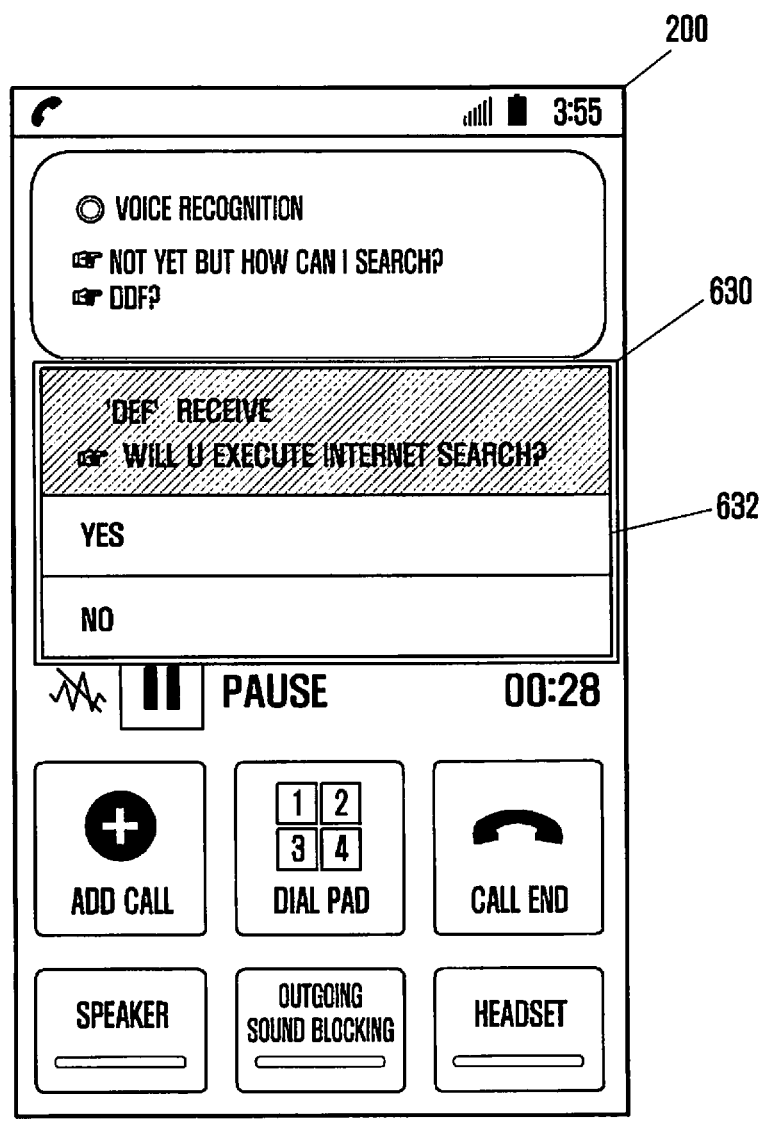
Figure 6D:
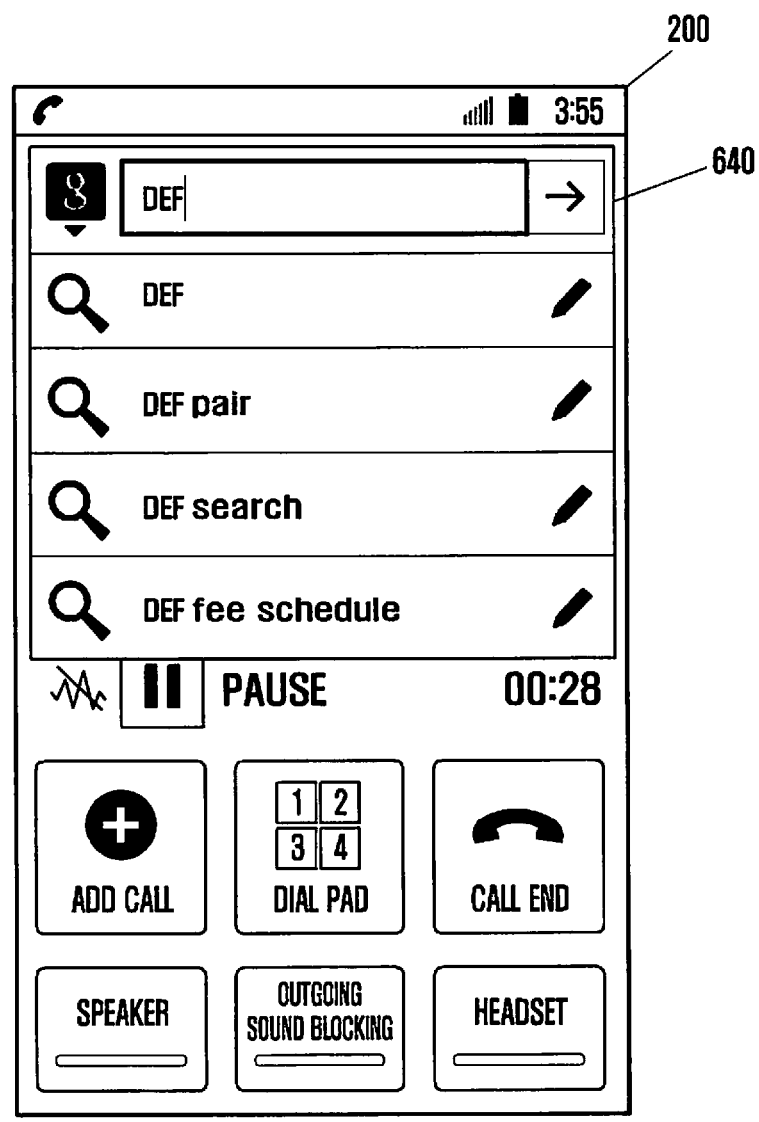

When the indication information is transmitted to the terminal 200, as shown in FIG. 6C, the terminal 200 displays an interface 630 asking whether to execute the Internet search function according to the indication information. When a "Yes" button 632 is selected, a screen 640 of the map search function may be displayed, as shown in FIG. 6D.

In the embodiments of FIGS. 4A to 6D, interfaces 430, 530, 630, which ask whether to execute the function, may be omitted. In this embodiment of the present invention, a function corresponding to the indication information may be performed without an input for a corresponding interface.

Figure 7:
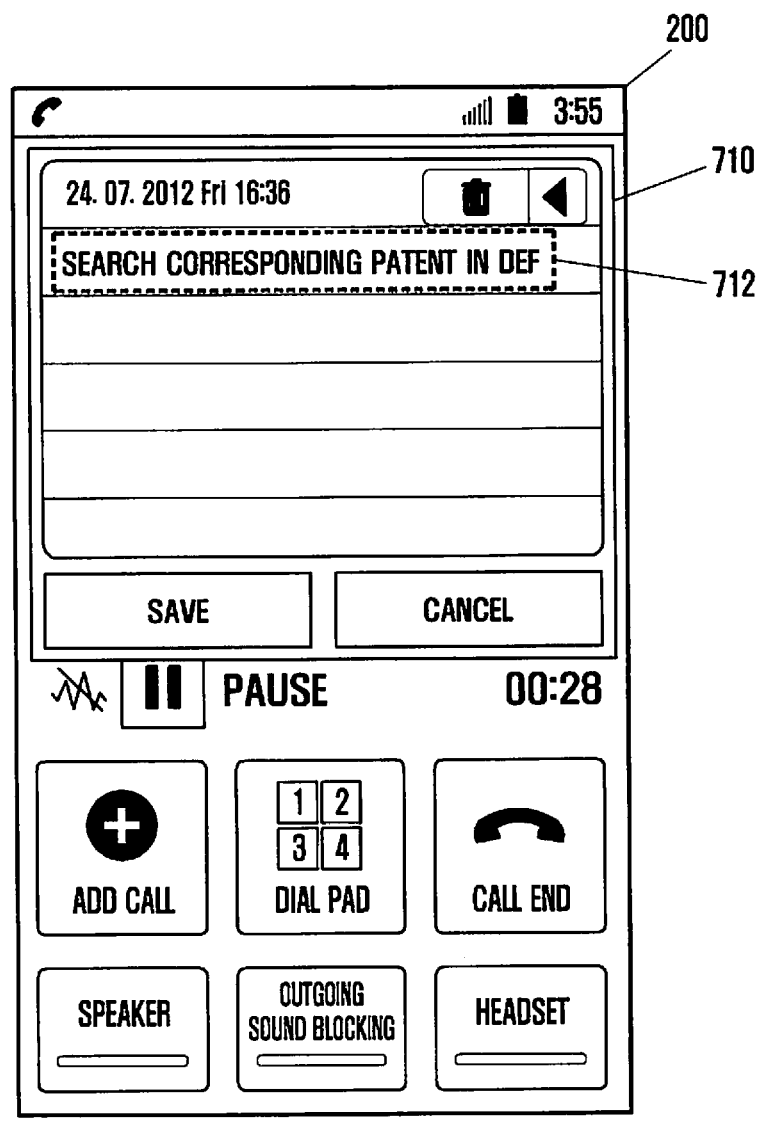
FIG. 7 is a diagram illustrating a memo function interface, according to an embodiment of the present invention.
Figure 8:
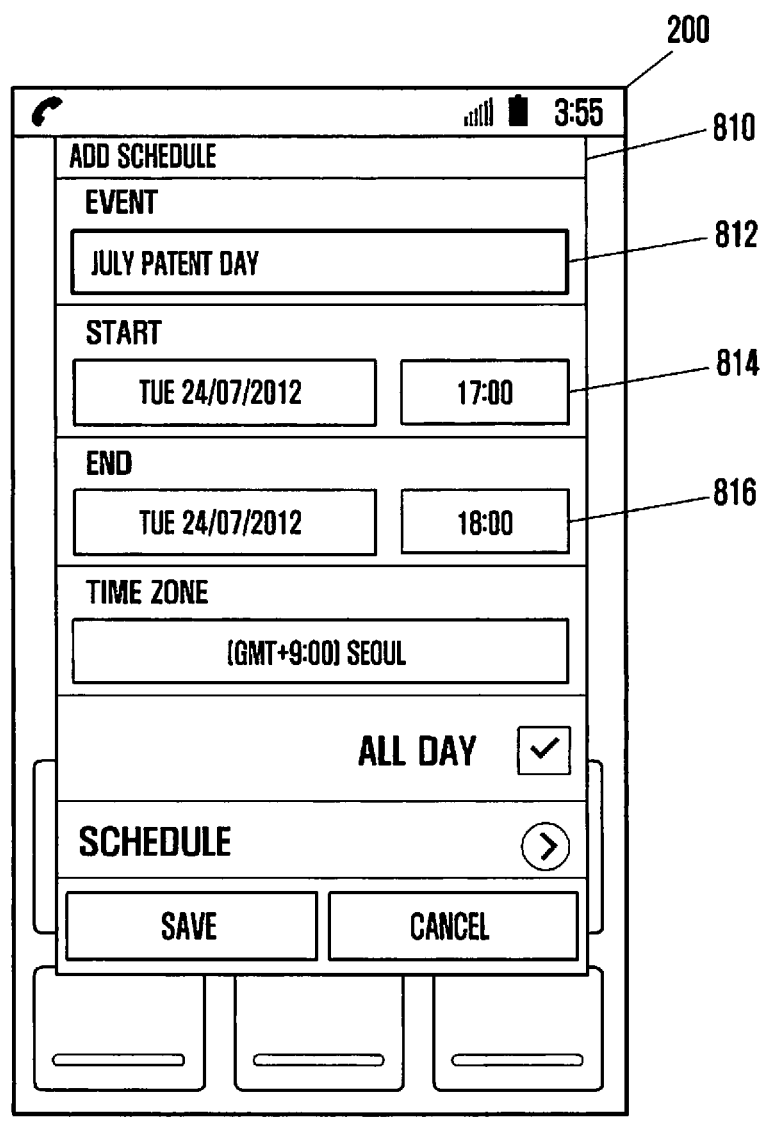
FIG. 8 is a diagram illustrating a schedule management interface, according to an embodiment of the present invention.

FIG. 7 is a diagram illustrating a memo function interface, according to an embodiment of the present invention. FIG. 8 is a diagram illustrating a schedule management interface, according to an embodiment of the present invention.

When the memo function or the schedule management interface are performed according to the procedure of FIG. 3A, additional information may be transmitted from the terminal 100 to the other user's terminal 200, and corresponding additional information may serve as an input of a corresponding function.

Returning to FIG. 3B, the terminal 100 receives an additional information selection input, in step 345.

For example, if the terminal 200 is performing a notepad function according to the procedure of FIG. 3A, the user of the terminal 100 may select text to be added as input for the notepad, and transmit this text as additional information to the other user's terminal 200. Alternatively, the user of the terminal 100 may select a function that transmits the text of a voice input, which is recognized after a certain point of time, as the additional information. When the additional information is generated in this manner, the additional information is transmitted, in step 350. The short message/multimedia message generation and transmission method as illustrated in FIG. 3C may be utilized for the transmission of the additional information. The additional information may all be transmitted at a single time or may be transmitted two or more times by dividing the additional information.

In step 355, the terminal 200 processes the transmitted additional information as an input for a function being performed. For example, in a notepad interface 710 of FIG. 7, a text "search corresponding patent in DEF" 712 transmitted as additional information is used as an input for a notepad and inputted. That is, if a certain text is input from the terminal 100 to transmit as additional information, a corresponding text is transmitted to the other user's terminal 200 as additional information, and the other user's terminal 200 may utilize the additional information as an input of a function being performed.

Referring to FIG. 8, a schedule function interface 810 is displayed. "July patent day" 812 is transmitted to the other user's terminal 200 as the additional information, and the terminal 200 utilizes "July patent day" 812 as an input for an item of event name of a schedule function being performed. In particular, when a text related to time and/or date is detected, the terminal 100 converts the text into time information and transmits additional information including the time information. In this case, the terminal 200 utilizes the additional information as an input for a start time 814 or an end time 816 among schedule information.

Each step of the flowcharts and a combination of the flowcharts may be performed by computer program instructions. Since computer program instructions may be mounted in a processor of a universal computer, a special computer or other programmable data processing equipment, instructions performed through a processor of a computer or other programmable data processing equipment generates means for performing functions described in steps of the flowcharts. Since the computer program instructions may be stored in a computer available or computer readable memory capable of orienting a computer or other programmable data processing equipment to implement functions in a specific scheme, instructions stored in the computer available or computer readable memory may produce manufacturing articles involving an instruction means executing functions described in steps of the flowcharts. Because the computer program instructions may be mounted on a computer or other programmable data processing equipment, a series of operation steps are performed in the computer or other programmable data processing equipment to create a process executed by the computer such that instructions performing the computer or other programmable data processing equipment may provide steps for executing functions described in steps of the flowcharts.

Further, each block may indicate a part of a module, a segment, or a code including at least one executable instruction for executing specific logical function(s). Several execution examples may generate functions described in steps out of an order. For example, two continuously shown steps may be simultaneously performed, and the steps may be performed in a reverse order according to corresponding functions.

The term "unit", as used herein, refers to software or a hardware structural element such as a Field-Programmable Gate Array (FPGA) or Application Specific Integrated Circuit (ASIC). The term "unit" is not limited to software or hardware. The term "unit" can be configured to be stored in an addressable storage medium and to play at least one processor. Accordingly, for example, the term "unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "units" may be engaged by the smaller number of structural elements and "units", or may be divided by additional structural elements and "units". Furthermore, structural elements and "units" may be implemented to play a device or at least one CPU in a security multimedia card.

A portable terminal, according to an embodiment of the present invention, may be embodied as, for example, a mobile phone, a Personal Digital Assistant (PDA), a navigation device, a digital broadcasting receiver, a Portable Multimedia Player (PMP), and the like.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of providing an interface of a first terminal, the method comprising the steps of:
   connecting a call between the first terminal and a second terminal;
   performing voice recognition on voice signals of the call to form texts representing spoken words;
   providing, to a display of the first terminal, a first interface including texts of voice recognition performed on a detected voice signal of the call while the call is connected with the second terminal, wherein providing the first interface comprises distinguishing and displaying the texts according to a type of a function corresponding to the texts;
   when a selection of the texts provided in the first interface is received, providing a second interface including one or more items each indicating a function corresponding to the selected texts in the first interface; and
   transmitting, from the first terminal to the second terminal, indication information indicating a function indicated by a selected item, when a selection of the item among the one or more items is received through the second interface,
   wherein the second interface comprises a location display item indicating a function for displaying a location of the first terminal on a map, when the texts are related to a location,
   wherein transmitting the indication information comprises transmitting the indication information to the second terminal, when a selection of the location display item is received, and
   wherein the indication information includes location information of the first terminal and a command for displaying the location of the first terminal on the map.

2. The method of claim 1, wherein transmitting the indication information comprises:
   transmitting the indication information in a short message type, when a length of the indication information is within a length range of a short message; and
   transmitting the indication information in a long message type or a multimedia message type, when the length of the indication information is greater than the length range of the short message.

3. A terminal comprising:
   a communication unit configured to connect a call between the terminal and a second terminal;
   an input unit configured to receive a selection;
   a display unit configured to display an interface screen; and
   a controller configured to control:
      performing voice recognition on voice signals of the call to form texts representing spoken words;
      providing to the display unit, a first interface including texts of voice recognition performed on a voice signal detected while the call is connected with the second terminal, wherein providing the first interface comprises distinguishing and displaying texts according to a type of a function corresponding to the texts,
      when a selection of the texts provided in the first interface is received, providing a second interface including one or more items, each indicating a function corresponding to the selected texts in the first interface, and
      transmitting, by the communication unit, indication information indicating a function indicated by a selected item, when a selection of the item among the one or more items is received through the second interface,
   wherein the second interface comprises a location display item indicating a function for displaying a location of the first terminal on a map, when the texts are related to a location,
   wherein transmitting the indication information comprises transmitting the indication information to the second terminal, when a selection of the location display item is received, and
   wherein the indication information includes location information of the first terminal and a command for displaying the location of the first terminal on the map.

4. The terminal of claim 3, wherein the communication unit is further configured to transmit the indication information in a short message type when a length of the indication information is within a length range of a short message, and transmit the indication information in a long message type or a multimedia message type when the length of the indication information is greater than the length range of the short message.

5. A method of providing an interface of a first terminal, the method comprising the steps of:
   connecting a call between the first terminal and a second terminal;
   performing voice recognition on voice signals of the call to form texts representing spoken words;
   receiving, from the second terminal, while the call is connected with the second terminal, a message including indication information indicating a function, wherein the indication information includes texts of voice recognition performed on a detected voice signal of the call and an indicator instructing an execution of the function, wherein the second terminal provides an interface which distinguishes and displays texts according to a type of a function corresponding to the texts; and performing the function when the message including the indication information is received from the second terminal, wherein the interface comprises a location display item indicating a function for displaying a location of the first terminal on a map, when the texts are related to a location, wherein transmitting the indication information comprises transmitting the indication information when a selection of the location display item is received, and wherein the indication information includes a command for displaying the location of the first terminal on the map.

6. The method of claim 5, wherein, when the function comprises a function for executing an application, further comprising:

after performing the function, inputting additional information to the application, when receiving the additional information from the second terminal.

7. The method of claim 5, wherein, when the function comprises a function for executing a text storage application, further comprising:

after the performing the function, inputting additional information to the text storage application, when receiving the additional information from the second terminal.

8. The method of claim 5, further comprising:

prior to performing the function, providing an interface that allows a user to select whether to perform the function, wherein performing the function comprises performing the function when the user selects performance of the function through the interface.

9. A terminal comprising:

a communication unit configured to connect a call between the terminal and a second terminal, perform voice recognition on voice signals of the call to form texts representing spoken words, and receive, from the second terminal, while the call is connected with the second terminal, a message including indication information indicating a function, wherein the indication information includes texts of voice recognition performed on a detected voice signal of the call and an indicator instructing an execution of the function, wherein the second terminal provides an interface which distinguishes and displays texts according to a type of a function corresponding to the texts; and a controller configured to perform the function when the message including the indication information indicating the function is received from the second terminal, wherein the interface comprises a location display item indicating a function for displaying a location of the terminal on a map, when the texts relate to location of the terminal, wherein the indication information is transmitted to the second terminal when a selection of the location display item is received, and wherein the indication information includes location information of the terminal and a command for displaying the location of the terminal on the map.

10. The terminal of claim 9, wherein, when the function comprises a function for executing an application, the controller is further configured to, after performing the function, input additional information to the application, when receiving the additional information from the second terminal.

11. The terminal of claim 9, wherein, when the function comprises a function for executing a text storage application, the controller is further configured to, after performing the function, input additional information to the text storage application, when receiving the additional information from the second terminal.

12. The terminal of claim 9, wherein the controller is further configured to, before performing the function, provide an interface that allows a user to select whether to perform the function, and to perform the function when the user selects performance of the function through the interface.

* * * * *